US011398738B1

(12) United States Patent
Lee et al.

(10) Patent No.: US 11,398,738 B1
(45) Date of Patent: Jul. 26, 2022

(54) WIRELESS POWER MODULE FOR NOISE REDUCTION AND ELECTRONIC DEVICE HAVING THE SAME

(71) Applicant: WITS Co., Ltd., Yongin-si (KR)

(72) Inventors: Jong Jin Lee, Suwon-si (KR); Heon Gyu Lee, Suwon-si (KR); Sang Hyup Lee, Suwon-si (KR); Tae Yong Kim, Suwon-si (KR); O Seong Choi, Suwon-si (KR)

(73) Assignee: WITS CO., Ltd., Gyeonggi-do (KR)

( * ) Notice: Subject to any disclaimer, the term of this patent is extended or adjusted under 35 U.S.C. 154(b) by 0 days.

(21) Appl. No.: 17/497,254

(22) Filed: Oct. 8, 2021

Related U.S. Application Data

(63) Continuation of application No. PCT/KR2021/008642, filed on Jul. 7, 2021.

(30) Foreign Application Priority Data

Jun. 17, 2021 (KR) .......................... 10-2021-0078976

(51) Int. Cl.
| | |
|---|---|
| *H02J 7/00* | (2006.01) |
| *H02J 50/00* | (2016.01) |
| *H02J 50/70* | (2016.01) |
| *G10K 11/168* | (2006.01) |

(52) U.S. Cl.
CPC .......... *H02J 7/0044* (2013.01); *G10K 11/168* (2013.01); *H02J 50/005* (2020.01); *H02J 50/70* (2016.02)

(58) Field of Classification Search
CPC ...... G10K 11/168; H02J 7/0044; H02J 50/70; H02J 50/005
See application file for complete search history.

(56) References Cited

U.S. PATENT DOCUMENTS

2018/0124959 A1    5/2018   Saab et al.

FOREIGN PATENT DOCUMENTS

| KR | 10-2017-0088184 A | 8/2017 |
|----|-------------------|--------|
| KR | 10-2018-0096018 A | 8/2018 |
| KR | 10-2018-0100749 A | 9/2018 |
| KR | 10-2018-0120048 A | 11/2018 |
| KR | 10-2019-0143242 A | 12/2019 |
| KR | 10-2020-0017071 A | 2/2020 |

*Primary Examiner* — Forrest M Phillips
(74) *Attorney, Agent, or Firm* — Harness, Dickey & Pierce, P.L.C.

(57) ABSTRACT

A wireless power module includes a coil layer including a coil including a curved area, a wiring board disposed on the coil layer, and a plurality of conductive lines disposed on the wiring board. At least a portion of the conductive lines crosses the curved area within a predetermined angle range when viewed in a plane.

13 Claims, 23 Drawing Sheets

10

WIRELESS POWER MODULE FOR NOISE REDUCTION AND ELECTRONIC DEVICE HAVING THE SAME

CROSS-REFERENCE TO RELATED APPLICATIONS

This application is a continuation of PCT International Application No. PCT/KR2021/008642 which has an International filing date of Jul. 7, 2021, and which claims priority to Korean patent application number 10-2021-0078976 filed Mar. 31, 2021, the entire contents of both of which are incorporated herein by reference.

BACKGROUND

1. Field of Disclosure

The present disclosure relates to a wireless power module for noise reduction and an electronic device including the wireless power module.

2. Description of the Related Art

Electromagnetic wave standards for a wireless charging electronic device are different for each manufacturer and each nation, and thus, the electromagnetic compatibility (EMC) testing is conducted under different conditions. Since it is required to solve the problem of high noise occurring in a specific frequency with respect to the standards for the wireless charger, the number of components for the noise reduction and the structural change of a printed circuit board (PCB) are increasing. However, fundamentally, there is a problem in that the influence of the noise generated between the coils of the wireless charger is large.

SUMMARY

The present disclosure provides a wireless power module with reduced noise.

The present disclosure provides an electronic device including the wireless power module.

Technical objectives to be achieved in various embodiments of the present disclosure should not be limited to the technical objectives mentioned above, and other technical objectives that are not mentioned here will be considered by those skilled in the art from various embodiments described hereinafter in the present disclosure. Embodiments of the inventive concept provide a wireless power module including a coil layer including a coil including a curved area, a wiring board disposed on the coil layer, and a plurality of conductive lines disposed on the wiring board. At least a portion of the conductive lines crosses the curved area within a predetermined angle range when viewed in a plane.

The predetermined angle range includes about 90 degrees.

The predetermined angle range includes a maximum value obtained by adding a predetermined value to the angle of about 90 degrees and a minimum value obtained by subtracting the predetermined value from the angle of about 90 degrees.

The predetermined value is about 5 degrees.

The conductive lines include an outer loop line disposed on the wiring board.

The conductive lines further include an inner loop line disposed on the wiring board and spaced apart from the outer loop line, a first branch line of which one end is connected to the outer loop line and the other end is short circuited, and a second branch line of which one end is connected to the inner loop line and the other end is short circuited.

The first branch line and the second branch line cross the curved area within the predetermined angle range when viewed in a plane.

The first branch line and the second branch line are alternately branched respectively from the outer loop line and the inner loop line.

The conductive lines include a base branch line branched from the outer loop line toward inside the wiring board, a first branch line of which one end is connected to the outer loop line and the other end is short circuited, and a second branch line of which one end is connected to the base branch line and the other end is short circuited, and the first branch line and the second branch line cross the curved area within the predetermined angle range when viewed in a plane.

The conductive lines further include an inner loop line disposed on the wiring board and spaced apart from the outer loop line and a connection line branched from the outer loop line toward inside the wiring board and protruded from the inner loop line by a predetermined length, and the connection line connects the outer loop line and the inner loop line.

The conductive lines further include a first branch line of which one end is connected to the outer loop line and the other end is short circuited and a second branch line of which one end is connected to the inner loop line and the other end is short circuited, and the first branch line and the second branch line cross the curved area within the predetermined angle range when viewed in a plane.

The conductive lines further include a plurality of inner base annular lines disposed on the wiring board and spaced apart from the outer loop line, a connection line branched from the outer loop line toward inside the wiring board and protruded from the inner base annular lines by a predetermined length, and a base branch line branched from the outer loop line to pass through between the inner base annular lines, and the connection line connects the outer loop line and the inner base annular lines.

The conductive lines further include a first branch line of which one end is connected to the outer loop line and the other end is short circuited and a second branch line of which one end is connected to one of the inner base annular lines and the other end is short circuited, and the first branch line and the second branch line cross the curved area within the predetermined angle range when viewed in a plane.

Embodiments of the inventive concept provide an electronic device including a body, a cover disposed to correspond to the body, and a wireless power module disposed between the body and the cover. The wireless power module includes a coil layer including a coil electrically connected to the body and including a curved area, a wiring board disposed on the coil layer, and a plurality of conductive lines disposed on the wiring board. At least a portion of the conductive lines crosses the curved area within a predetermined angle range when viewed in a plane.

The above-described embodiments of the present disclosure are just parts of preferred embodiments of the present disclosure, and various embodiments reflecting the technical features of this disclosure can be derived and understood by those skilled in the art based on the following detailed descriptions of the present disclosure.

According to various embodiments of the present disclosure, the following effects are obtained.

According to various embodiments of the present disclosure, the wireless power module with reduced noise and the electronic device including the wireless power module are provided.

In addition, it is possible to reduce heat generated during the wireless power transmission and reception.

Further, the electronic device in which the coil layer and the conductive layer are integrally stacked with the substrate is provided.

Further, a ferrite wall structure is applied, and thus, noise is reduced.

Effects that can be obtained from the various embodiments of the present disclosure should not be limited to the effects described above, and other effects that are not mentioned here can be clearly derived and understood by those skilled in the art based on the detailed descriptions of the present disclosure.

BRIEF DESCRIPTION OF THE DRAWINGS

The accompanying drawings are provided to help understanding of various embodiments of the present disclosure, and various embodiments of the present disclosure are provided together with detailed descriptions. However, the technical features of various embodiments of the present disclosure should not be limited to specific drawings, and features disclosed in each drawing may be combined with each other to constitute a new embodiment. Reference numerals in each drawing may mean structural elements.

DETAILED DESCRIPTION

Figure 1:
FIG. 1 is a view showing a wireless power module according to an embodiment of the present disclosure.
Figure 1:
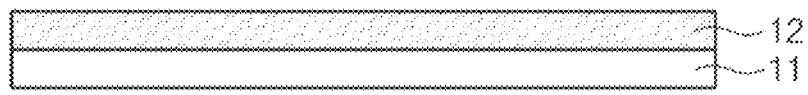

Hereinafter, embodiments of the present disclosure will be described in detail with reference to accompanying drawings. As specific structural or functional descriptions for the embodiments according to the concept of the invention disclosed herein are merely exemplified for purposes of describing the embodiments according to the concept of the invention, the embodiments according to the concept of the invention nay be embodied in various forms but are not limited to the embodiments described herein.

In some cases, in order to avoid obscuring the concept of the present disclosure, descriptions or illustrations of well-known structures and devices will be omitted, or each structure or device will be illustrated in a block diagram centered on core functions thereof. In addition, the same components will be described using the same reference numerals throughout the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

It will be understood that, although the term's "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

In various embodiments of the present disclosure, "/"and"," should be construed as indicating "and/or". For instance, "A/B" means "A and/or B". Further, "A, B" means "A and/or B". Further, "A/B/C" means "at least one of A, B, and/or C". Further, "A, B, C" means "at least one of A, B, and/or C".

In various embodiments of the present disclosure, "or" should be construed as indicating "and/or". For instance, "A or B" means "only A, only B, and/or both A and B". In other words, "or" should be construed as indicating "additionally or alternatively".

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, embodiments of the present disclosure will be described with reference to accompanying drawings.

Wireless Power Module

FIG. 1 is a view showing a wireless power module 10 according to an embodiment of the present disclosure.

Referring to FIG. 1, the wireless power module 10 may be applied to a wireless power transmitter or a wireless power receiver for a wireless power transmission and reception and may include a coil layer for the wireless power transmission and reception and a conductive layer for a noise filtering of a wireless power signal.

The coil layer may include a ferrite 11 and a coil 12 disposed on the ferrite 11. The coil 12 may be formed on the ferrite 11 in various patterns for the wireless power transmission and reception and may be wound a different number of times depending on the design.

The conductive layer may be disposed on the coil layer. The conductive layer may include a wiring board 21 and a plurality of conductive lines 22 disposed on the wiring board 21. In the present disclosure, the conductive line 22 may correspond to a transmission line.

The ferrite 11 may be formed of a variety of material with a magnetic flux density and a permeability, such as MnZn, NiZn, permalloy, Si—Fe, sendust, amorphous solid, nanocrystalline material, etc.

The wiring board 21 may be a variety of substrates, such as a printed circuit board (PCB), a flexible printed circuit board (FPCB), a ceramic substrate, a pre-molded substrate, a direct bonded copper (DBC) substrate, an insulated metal substrate (IMS), or the like. According to an embodiment, the ferrite 11 and the wiring board 21 may include a material containing an epoxy resin, e.g., FR-3, FR-4, etc.

The conductive lines 22 may be coupled to each other, and the conductive lines 22 with different short-circuit positions may be alternately arranged with each other. As the conductive lines 22 are alternately arranged with each other and coupled to each other, the conductive layer may perform a function of a resonator that filters a specific frequency band of the wireless power signal, i.e., a filter. In particular, the conductive lines 22 may be designed to filter a noise of the wireless power signal.

Hereinafter, the conductive layers according to embodiments of the present disclosure will be described.

FIGS. 2A to 2F are plan views showing the conductive layers according to embodiments of the present disclosure.

Referring to FIGS. 1 and 2A to 2E, the conductive lines 22 included in the conductive layers according to embodiments of the present disclosure may be formed on the wiring board 21, and at least some of the conductive lines 22 may be formed to cross a curved area of the coil layer within a predetermined angle range when viewed in a plane. As the at least some of the conductive lines 22 cross the curved area of the coil layer within the predetermined angle range when viewed in a plane, a noise filtering effect of the wireless power signal may be improved compared with that when the conductive lines 22 vertically or horizontally cross only the other area of the coil layer, i.e., a straight area, except the curved area of the coil layer.

The predetermined angle range where the curved area of the coil layer crosses the conductive line 22 may include about 90 degrees. Accordingly, the conductive line 22 may be formed to be perpendicular or similarly perpendicular to the curved area of the coil layer.

As an example, the predetermined angle range may include a maximum value obtained by adding a predetermined value to the angle of about 90 degrees and a minimum value obtained by subtracting the predetermined value from the angle of about 90 degrees. The predetermined value may be about 5 degrees. In the case where the predetermined value is about 5 degrees, i.e., in a case where the predetermined angle range is within a range from about 85 degrees to about 95 degrees, the noise filtering effect may be further maximized.

According to an embodiment, the predetermined value may be about 45 degrees. In the case where the predetermined value is about 45 degrees, i.e., in the case where the predetermined angle range is from about 45 degrees to about 135 degrees, the conductive line 22 may be designed to have various patterns.

The at least some of the conductive lines 22 may have a variety of shape to cross the curved area of the coil layer within the predetermined angle range.

As an example, the conductive lines 22 may include an outer loop line and a plurality of branch lines, which are formed on the wiring board 21 as shown in FIGS. 2A to 2E. The outer loop line may have a shape of which a portion includes a curved area and the other portion includes a straight area or a circular shape, and the outer loop line may have a variety of shapes. The branch lines may include a first branch line and a second branch line, which respectively include one ends that are short-circuited at different positions from each other. Each of the first branch line and the second branch line may be provided in plural, and the first branch lines may be alternately arranged with the second branch lines. Hereinafter, the shape of each of the conductive lines 22 will be described in detail with reference to FIGS. 2A to 2E.

Hereinafter, the first branch line and the second branch line may be used as a concept encompassing all branch lines with a variety of shapes that are alternately arranged with each other and respectively include one ends short-circuited at different positions. In addition, a base branch line may be used as a concept encompassing all base branch lines with a variety of shapes that are branched from the outer loop line and have their own branch lines.

Figure 2A:
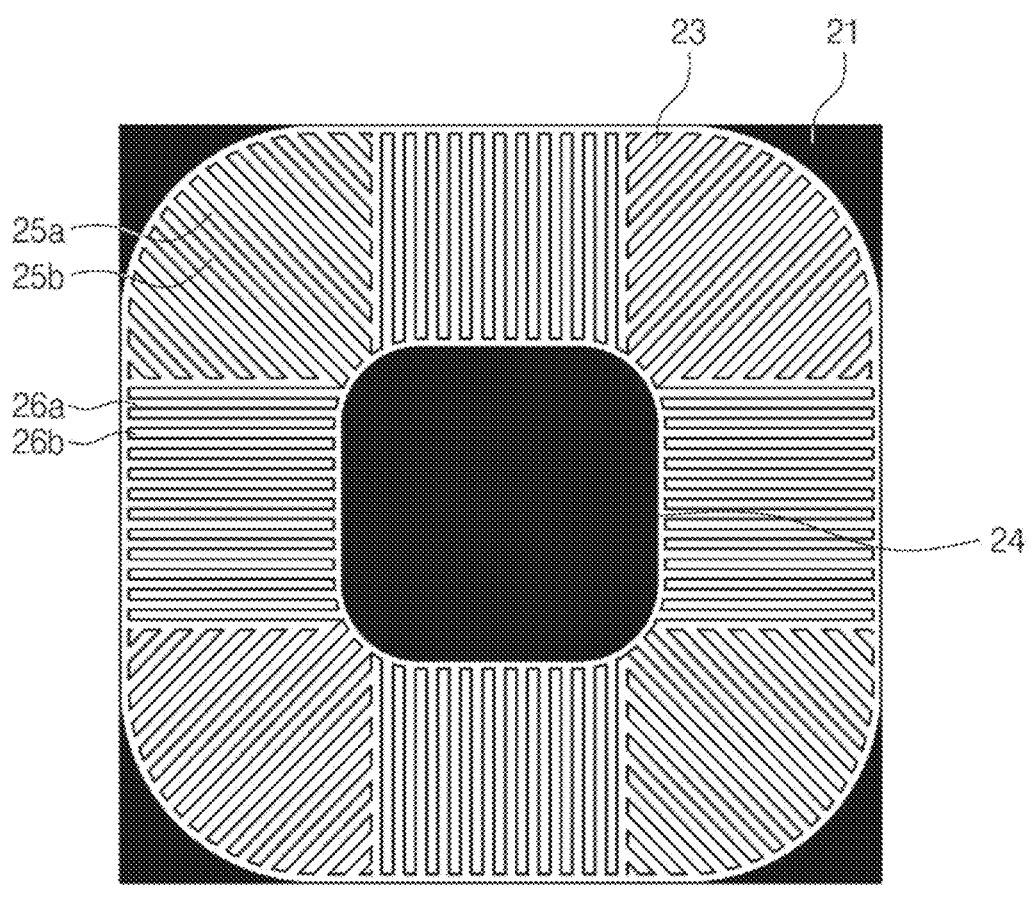
FIGS. 2A to 2F are plan views showing conductive layers according to embodiments of the present disclosure.
Figure 2A:
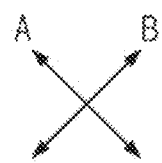

Referring to FIG. 2A, the conductive lines 22 may include the outer loop line 23 and an inner loop line 24 disposed on the wiring board 21 and spaced apart from the outer loop line 23. The outer loop line 23 and the inner loop line 24 may be spaced apart from each other and may not be physically connected to each other. In addition, the outer loop line 23 and the inner loop line 24 may be a closed loop.

The branch lines may include a first branch line 25a of which one end is connected to the outer loop line 23 and the other end is short circuited and a second branch line 25b of which one end is connected to the inner loop line 24 and the other end is short circuited. The first branch line 25a and the second branch line 25b may be alternately branched respectively from the outer loop line 23 and the inner loop line 24 along a first axis A or a second axis B.

Among the branch lines, the first branch line 25a and the second branch line 25b may cross the curved area of the coil layer within the predetermined angle range when viewed in a plane. Accordingly, the conductive line 22 may be perpendicular or similarly perpendicular to the coil layer in the curved area, and thus, the noise filtering effect of the wireless power signal may be further improved.

The branch lines may include a third branch line 26a of which one end is connected to the outer loop line 23 and the other end is short circuited and a fourth branch line 26b of which one end is connected to the inner loop line 24 and the other end is short circuited. The third branch line 26a and the fourth branch line 26b may be alternately branched respectively from the outer loop line 23 and the inner loop line 24 along an X-axis or a Y-axis. Hereinafter, the X-axis and the Y-axis may correspond to a horizontal axis and a vertical axis of the drawings, respectively.

The third branch line 26*a* and the fourth branch line 26*b* may be substantially perpendicular to the straight area of the coil layer when viewed in a plane.

Figure 2B:
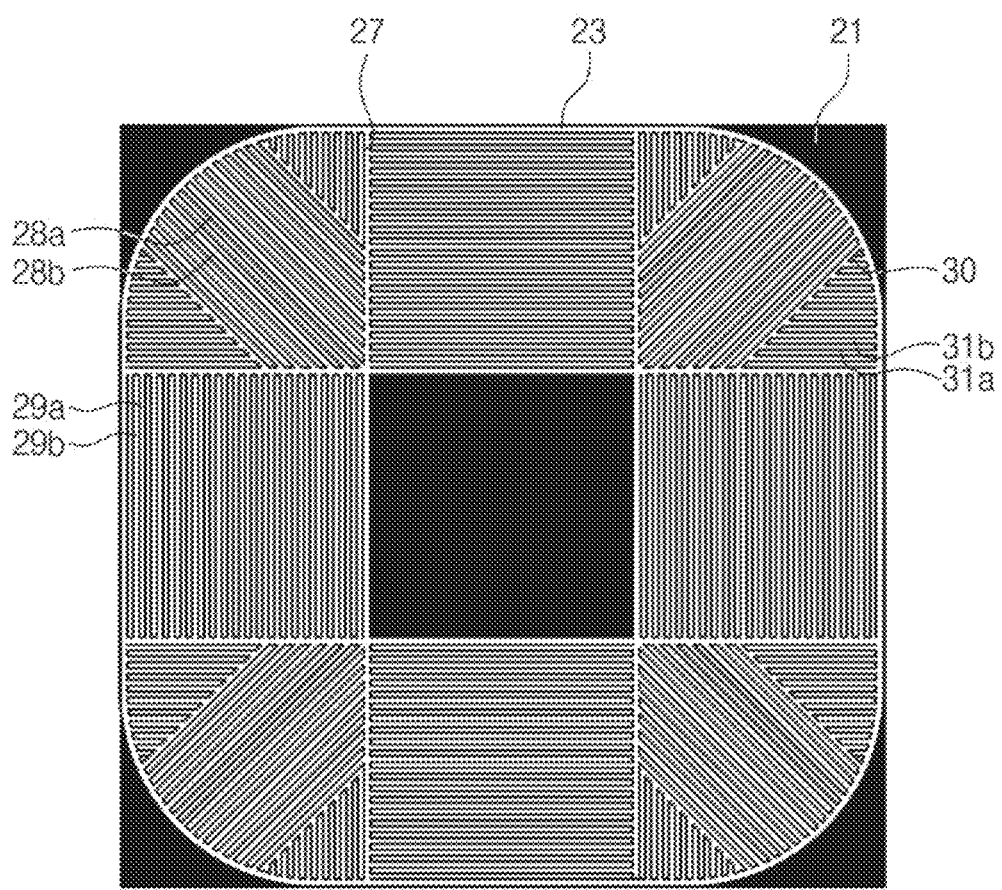
Figure 2B:
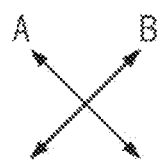

Referring to FIG. 2B, the branch lines may include a base branch line 27 branched from an outer loop line 23 toward inside the wiring board 21. The base branch line 27 may be branched along the X-axis or the Y-axis and may be provided in plural.

The branch lines may include a first branch line 28*a* of which one end is connected to the outer loop line 23 and the other end is short circuited and a second branch line 28*b* of which one end is connected to the base branch line 27 and the other end is short circuited. The first branch line 28*a* and the second branch line 28*b* may be alternately branched respectively from the outer loop line 23 and the base branch line 27 along the first axis A or the second axis B.

Among the branch lines, the first branch line 28*a* and the second branch line 28*b* may cross the curved area of the coil layer within the predetermined angle range when viewed in a plane. Accordingly, the conductive line 22 may be perpendicular or similarly perpendicular to the coil layer in the curved area, and thus, the noise filtering effect of the wireless power signal may be further improved.

The branch lines may include a third branch line 29*a* of which one end is connected to the base branch line 27 and the other end is short circuited and a fourth branch line 29*b* of which one end is connected to the base branch line 27 and the other end is short circuited. The third branch line 29*a* and the fourth branch line 29*b* may be alternately branched from the base branch line 27 along the X-axis or the Y-axis.

The third branch line 29*a* and the fourth branch line 29*b* may be substantially perpendicular to the straight area of the coil layer when viewed in a plane.

In addition, the branch lines may include a sub-base line 30 that is branched from the outer loop line 23 toward inside the wiring board 21 and is branched along a first direction A or a second direction B. The sub-base branch line 30 may be provided in plural.

The branch lines may include a fifth branch line 31*a* of which one end is connected to the outer loop line 23 and the other end is short circuited and a sixth branch line 31*b* of which one end is connected to the sub-base branch line 30 and the other end is short circuited. The fifth branch line 31*a* and the sixth branch line 31*b* may be alternately branched respectively from the outer loop line 23 and the sub-base branch line 30 along the X-axis or the Y-axis and may have different lengths from each other. As an example, the branch lines, which are alternately arranged along the X-axis among the fifth branch line 31*a* and the sixth branch line 31*b*, may be formed such that their lengths are sequentially increased. As an example, the branch lines, which are alternately arranged along the Y-axis among the fifth branch line 31*a* and the sixth branch line 31*b*, may be formed such that their lengths are sequentially increased.

Figure 2C:
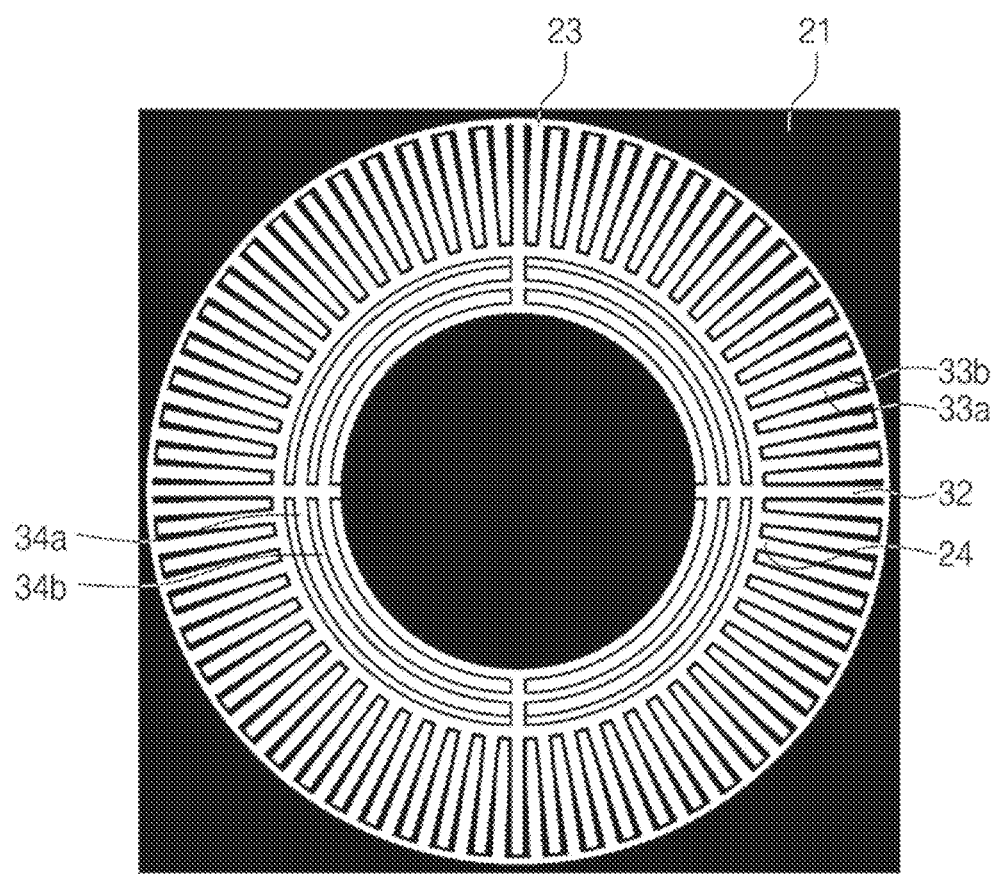
Figure 2C:
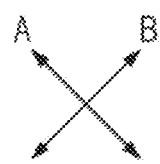

Referring to FIG. 2C, the conductive lines 22 may include an outer loop line 23, an inner loop line 24 disposed on the wiring board 21 and spaced apart from the outer loop line 23, and a connection line 32 branched from the outer loop line 23 toward inside the wiring board 21 and protruded from the inner loop line 24 by a predetermined length. The outer loop line 23 and the inner loop line 24 may be a closed loop. The connection line 32 may physically connect the outer loop line 23 to the inner loop line 24, may be branched along the X-axis or the Y-axis, and may be provided in plural.

The branch lines may include a first branch line 33*a* of which one end is connected to the outer loop line 23 and the other end is short circuited and a second branch line 33*b* of which one end is connected to the inner loop line 24 and the other end is short circuited. The first branch line 33*a* and the second branch line 33*b* may be alternately branched respectively from the outer loop line 23 and the inner loop line 24 at every predetermined angle.

In a case where the coil layer has a circular shape, the first branch line 33*a* and the second branch line 33*b* among the branch lines may cross all curved areas within a predetermined angle range when viewed in a plane. Accordingly, the conductive line 22 may be perpendicular or similarly perpendicular to the coil layer in the curved area, and thus, the noise filtering effect of the wireless power signal may be further improved.

The connection line 32 may include a protruding section protruded from the inner loop line 24. The protruding section may include a first protruding section corresponding to the X-axis direction and a second protruding section corresponding to the Y-axis direction.

The branch lines may include a first annular line 34*a* of which one end is connected to the first protruding section and the other end is short circuited and a second annular line 34*b* of which one end is connected to the second protruding section and the other end is short circuited. The first annular line 34*a* may be provided in plural and may be branched from the first protruding section in a third direction (a clockwise direction) or a fourth direction (a counter-clockwise direction). The second annular line 34*b* may be provided in plural and may be branched from the second protruding section in the third direction (the clockwise direction) or the fourth direction (the counter-clockwise direction).

The first annular line 34*a* and the second annular line 34*b* may be alternately arranged with each other.

Figure 2D:
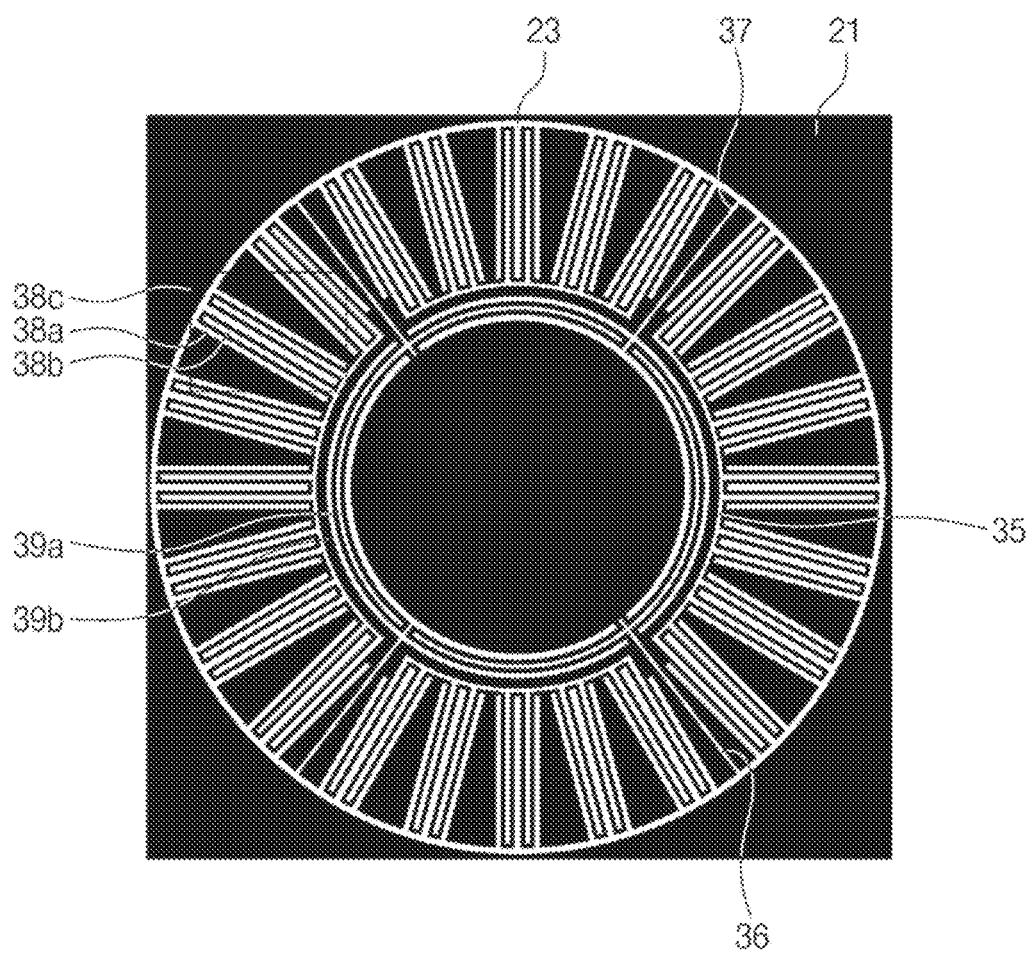
Figure 2D:
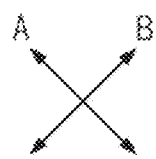

Referring to FIG. 2D, the conductive lines 22 may include an outer loop line 23, a plurality of inner-base annular lines 35 disposed on the wiring board 21 and spaced apart from the outer loop line 23, a connection line 36 branched from the outer loop line 23 toward inside the wiring board 21 and protruded from the inner-base annular line 35 by a predetermined length, and a base branch line 37 branched from the outer loop line 23 to pass through between the inner-base annular lines 35.

The inner-base annular line 35 may be provided in plural and may be spaced apart from each other.

The branch lines may include a first branch line 38*a* of which one end is connected to the outer loop line 23 and the other end is short circuited and a second branch line 38*b* of which one end is connected to one of the inner-base annular lines 35 and the other end is short circuited. The first branch line 38*a* and the second branch line 38*b* may be alternately branched respectively from the outer loop line 23 and the inner-base annular lines 35 at every predetermined angle. In particular, the first branch line 38*a* and the second branch line 38*b* may be grouped into a group branch line 38*c* at every predetermined interval along the outer loop line 23. The group branch line 38*c* may include the first branch lines 38*a* and the second branch lines 38*b* alternately arranged with the first branch lines 38*a* and may be provided in plural. The group branch lines 38*c* may be spaced apart from each other at every predetermined interval along the outer loop line 23.

In a case where the coil layer has a circular shape, the first branch line 38*a* and the second branch line 38*b* among the branch lines may cross all curved areas within a predetermined angle range when viewed in a plane. Accordingly, the conductive line 22 may be perpendicular or similarly perpendicular to the coil layer in the curved area, and thus, the noise filtering effect of the wireless power signal may be further improved.

The connection line 36 may include a protruding section protruding from the inner-base annular line 35. The protruding section may include a first protruding section corresponding to the first direction A.

The branch lines may include a first annular line 39a of which one end is connected to the first protruding section and the other end is short circuited and a second annular line 39b of which one end is connected to the base branch line 37 and the other end is short circuited. The first annular line 39a may be provided in plural and may be branched from the first protruding section in a third direction (a clockwise direction) or a fourth direction (a counter-clockwise direction). The second annular line 39b may be provided in plural and may be branched from a second protruding section in the third direction (clockwise direction) or the fourth direction (counter-clockwise direction). The first annular line 39a and the second annular line 39b may be alternately arranged with each other.

Figure 2E:
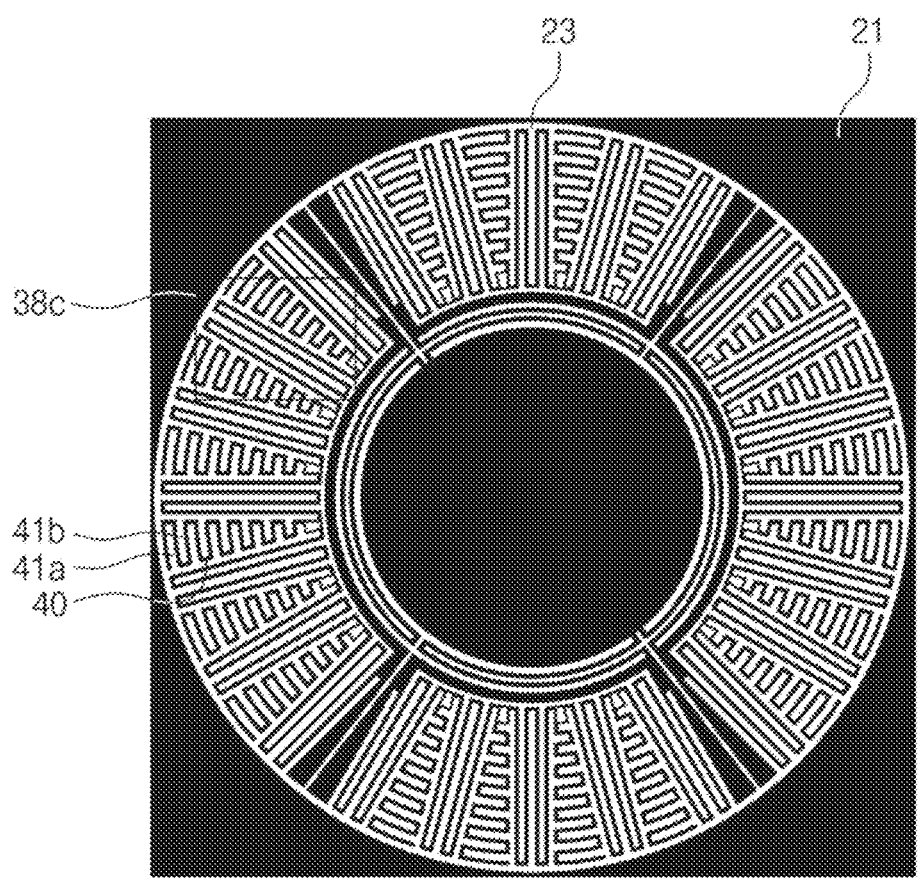
Figure 2E:
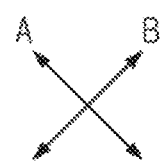

Referring to FIG. 2E, a sub-base branch line 40 branched from an outer loop line 23 in an area corresponding to between a group branch line 38c, a third branch line 41a, and a fourth branch line 41b may be additionally provided to the branch lines shown in FIG. 2D. The third branch line 41a and the fourth branch line 41b may be branched from the sub-base branch line 40 in a third direction (a clockwise direction) or a fourth direction (a counter-clockwise direction).

Each of the third branch line 41a and the fourth branch line 41b may be provided in plural, and the third branch line 41a may be alternately arranged with the fourth branch line 41b.

Figure 2F:
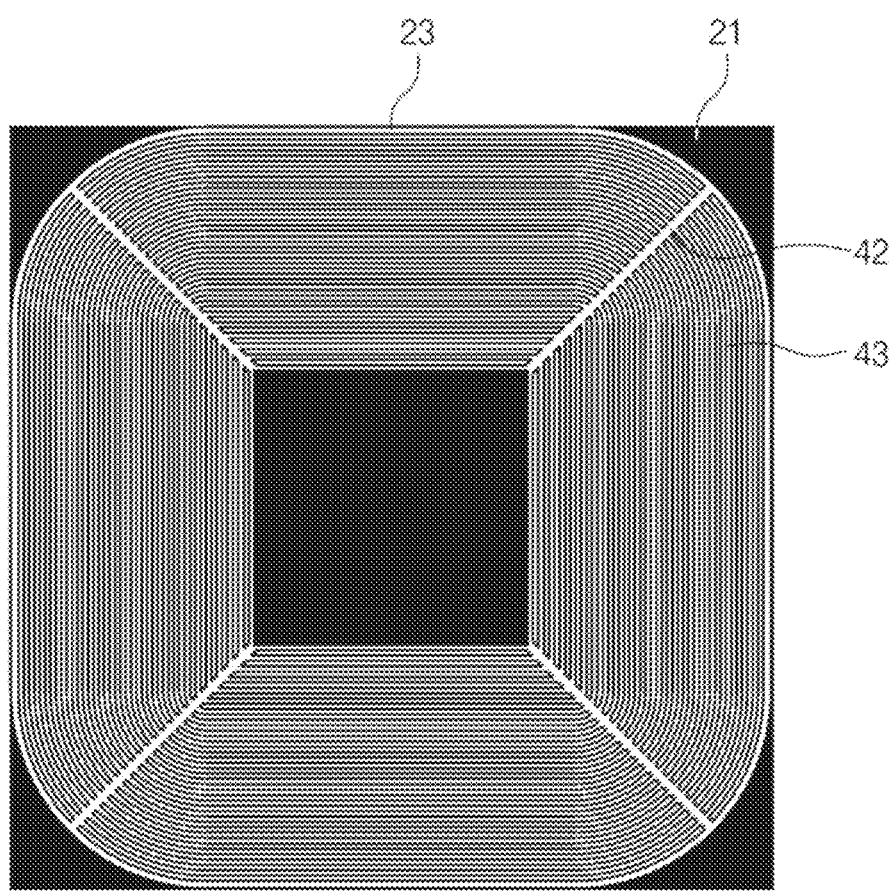
Figure 2F:
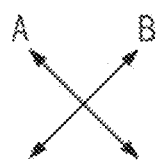

Different from the embodiment shown in FIGS. 2A to 2E, the conductive lines 22 included in the conductive layer may be formed in a form corresponding to a form of a coil 12 as shown in FIG. 2F.

As an example, the conductive lines 22 may include an outer loop line 23 disposed on the wiring board 21, a base branch line 42 branched from the outer loop line 23 in the first direction A or the second direction B, and a plurality of branch lines 43 branched from the base branch line 42.

One end of the branch lines 43 may be connected to one of the base branch lines 42, and the other end of the branch lines 43 may be short circuited. The branch lines 43 may be formed to allow their lengths to decrease as it goes inwardly.

FIG. 2F shows a structure in which some of the branch lines 43 include a straight section and a curved section extending from the straight section, however, the structure should not be limited thereto or thereby. According to an embodiment, the branch lines 43 may be formed to include only the straight section. According to an embodiment, the branch lines 43 may be formed to include only the curved section without the straight section.

According to an embodiment, a size of an area in which the branch line is not formed in the outer loop line 23 of the substrate may be controlled as shown in FIG. 2F.

FIGS. 3A to 3F are plan views showing wireless power modules according to embodiments of the present disclosure. Hereinafter, in FIGS. 3A to 3F, descriptions of the same elements as those described above will be omitted.

Referring to FIGS. 3A to 3F, a conductive layer included in each wireless power module 10 may include an electrode 50 electrically connected to a conductive line 22 according to the above embodiments.

The electrode 50 may be provided in plural, and the electrodes 50 may be disposed at corners of the wiring board 21, respectively. The electrode 50 may have various sizes and shapes.

The electrode 50 may be connected to one of a plurality of base branch lines 51 as shown in FIGS. 3A to 3D.

Figure 3A:
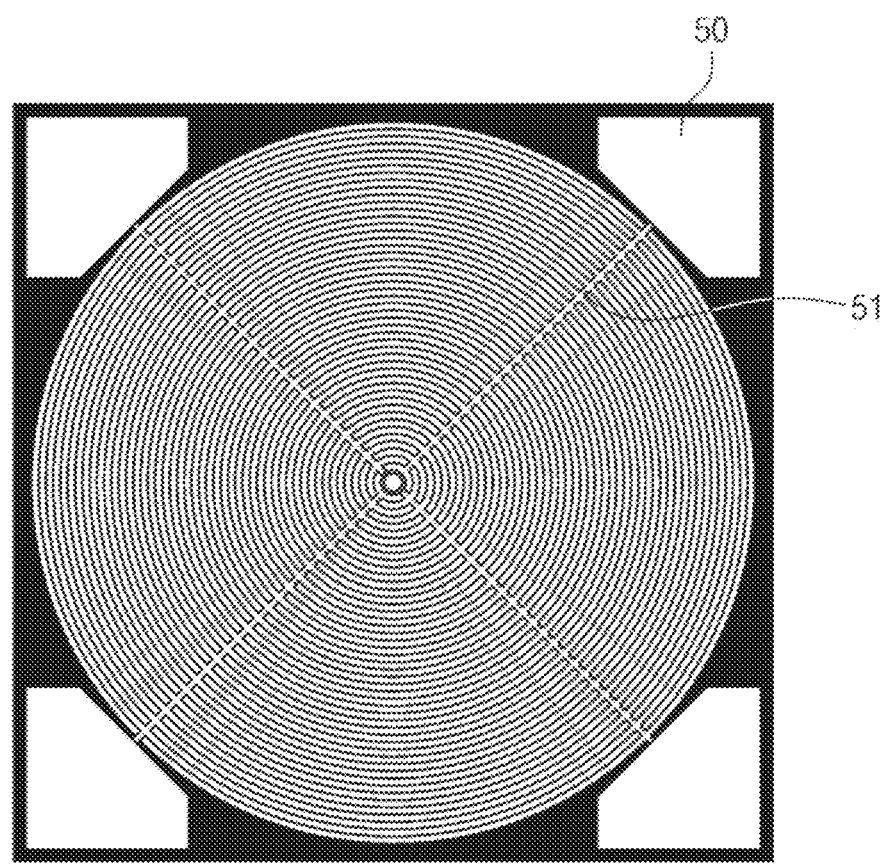
FIGS. 3A to 3F are plan views showing wireless power modules according to embodiments of the present disclosure.
Figure 3A:
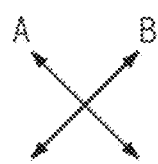
Figure 3B:
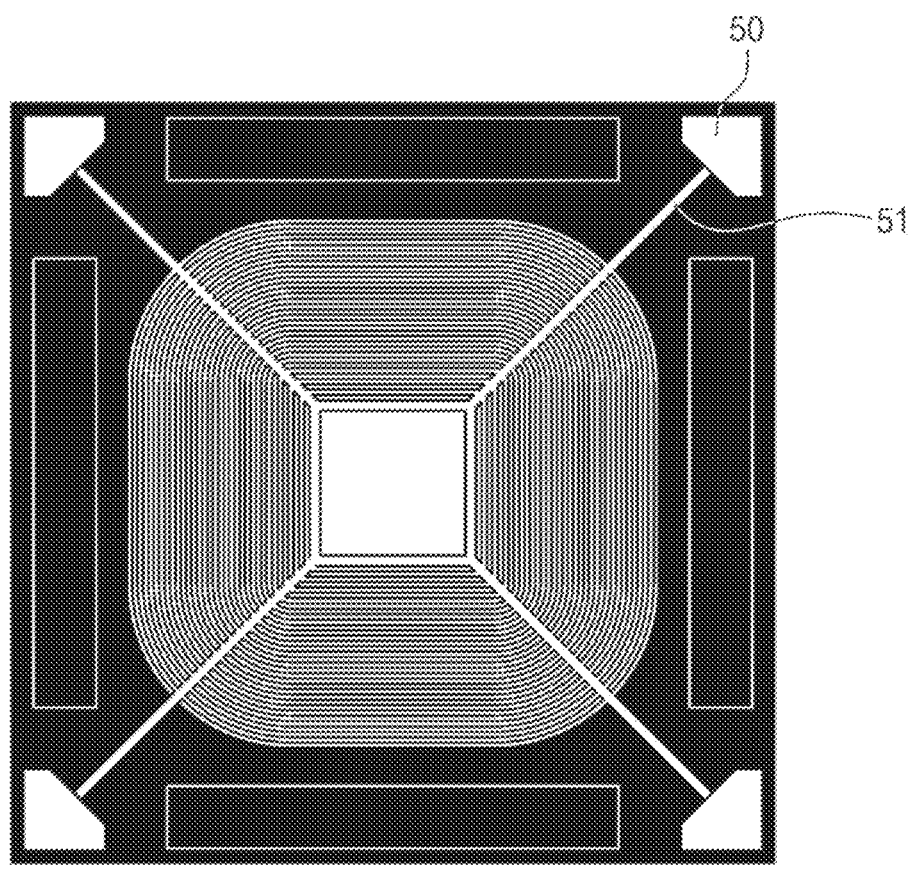
Figure 3B:
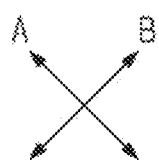
Figure 3C:
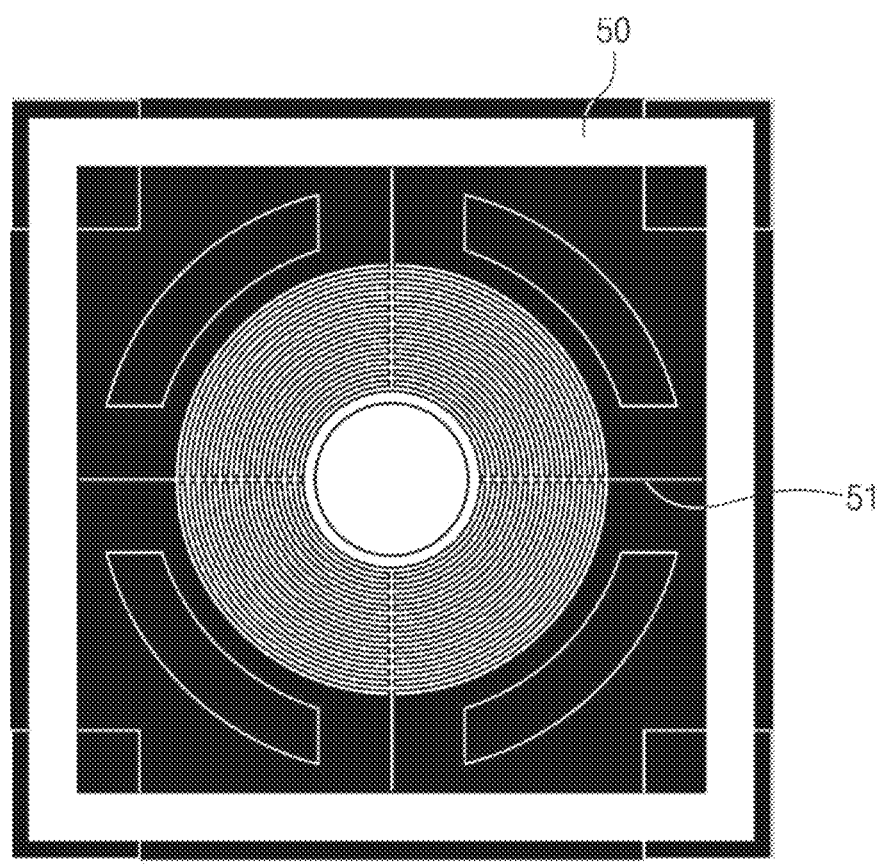
Figure 3C:
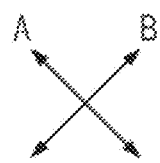
Figure 3D:
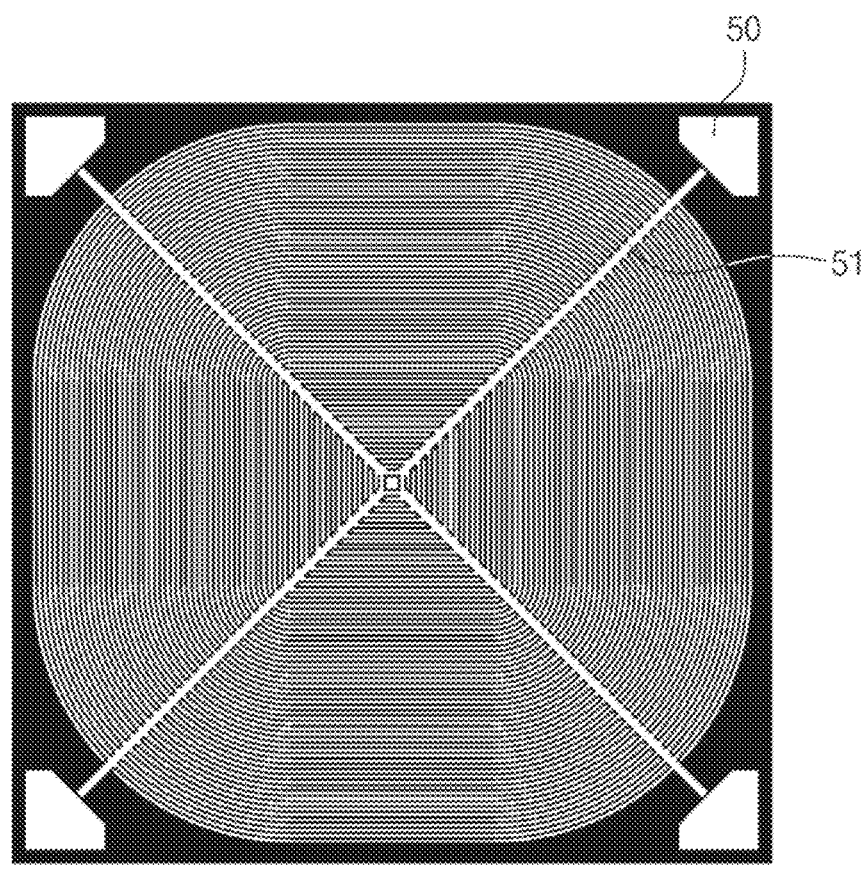
Figure 3D:
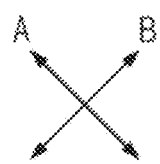
Figure 3E:
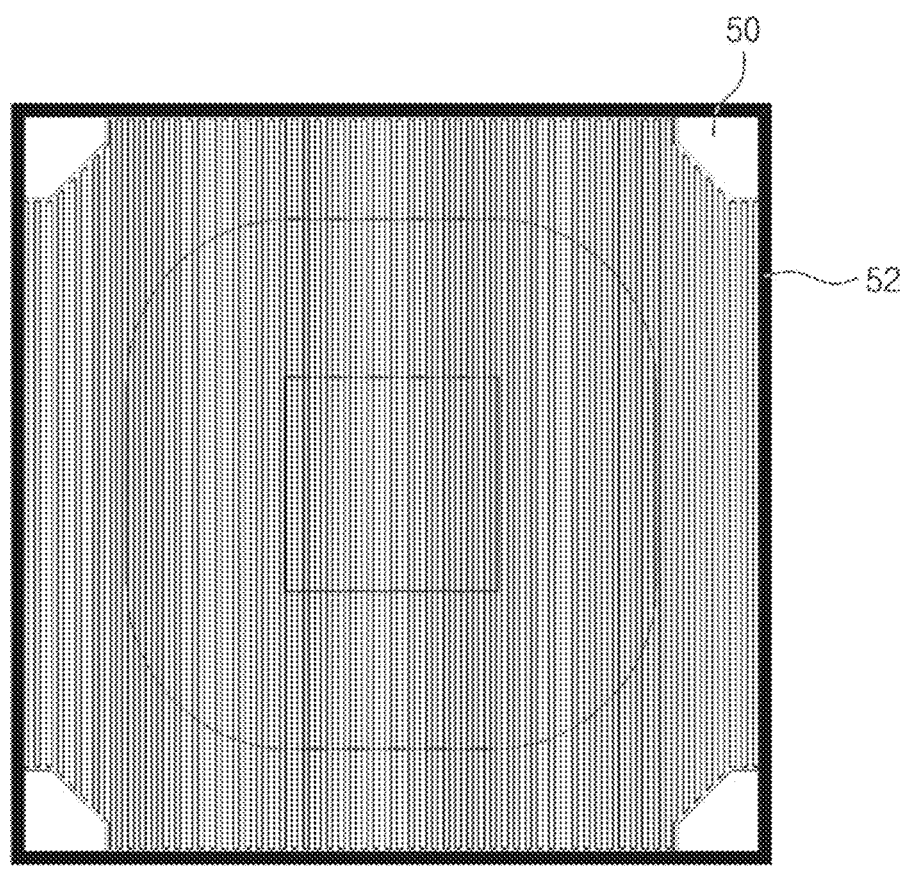
Figure 3E:
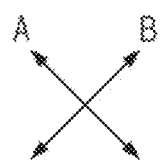
Figure 3F:
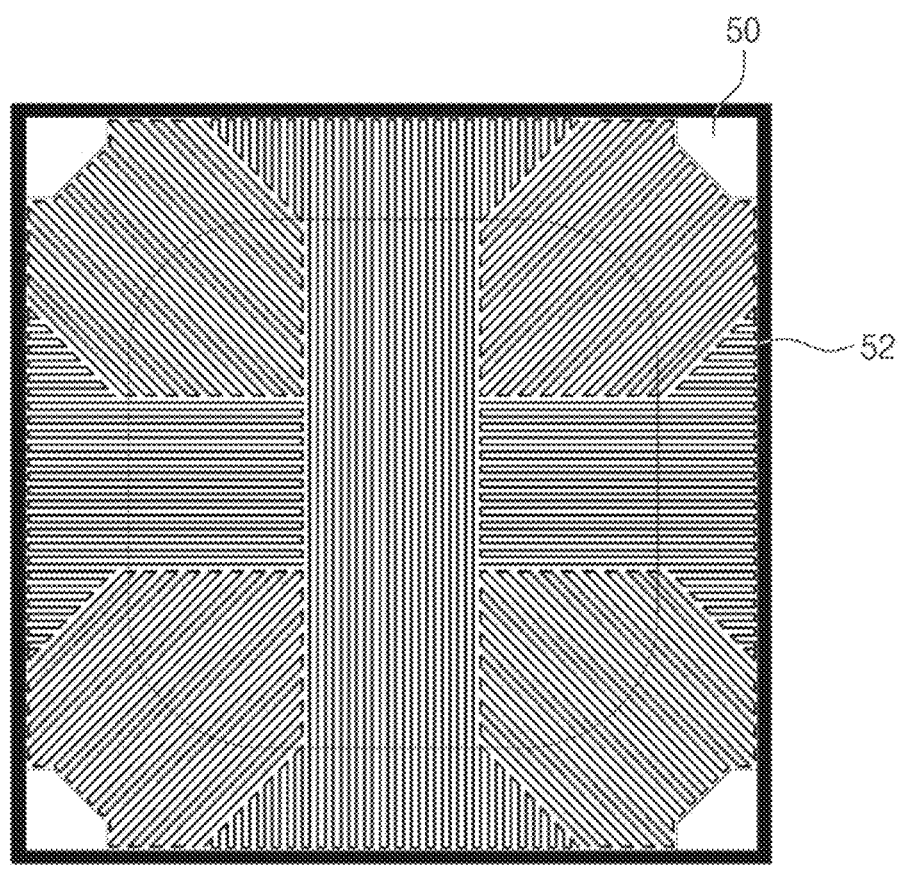
Figure 3F:
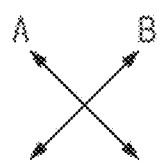

As another way, the electrode 50 may be connected to an outer loop line 52 as shown in FIGS. 3E and 3F.

The wireless power modules 10 according to embodiments of the present disclosure may further include a ground layer.

The ground layer may correspond to the wiring board 21, may be disposed between the wiring board 21 and the conductive lines 22, or may be disposed at one side of the wiring board 21. The ground layer may be disposed at the corners of the wiring board 21.

The ground layer may be connected to a plurality of conductive patterns to block the noise generated in a specific band and to reduce a size of the noise. In addition, the ground layer may distribute a heat generated during the wireless power transmission and reception to the ground layer.

The wireless power modules 10 according to embodiments of the present disclosure may further include a heat distributor (not shown).

The heat distributor (not shown) may include a variety of members to lower a temperature of the coil layer and/or the conductive layer when the heat is generated due to the wireless power transmission and reception and may be disposed on the ferrite 11 and/or the wiring board 21.

Problems related to compatibility authentication or user safety caused by the heat generated by the wireless power module 10 may be solved by the ground layer and the heat distributor (not shown), which are described above.

The wireless power modules 10 according to the various embodiments of the present disclosure may be provided in an integral shape.

Figure 4:
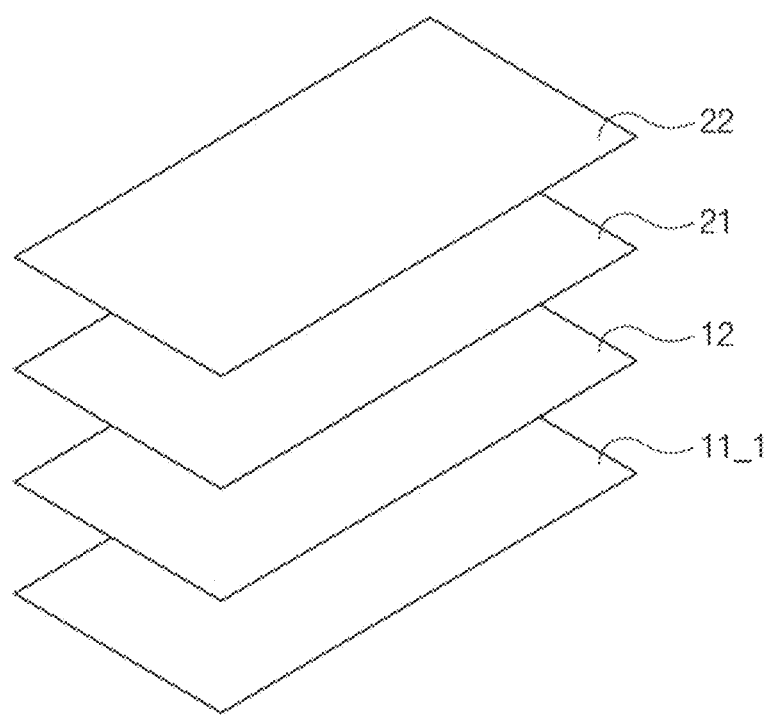
FIG. 4 is an exploded perspective view showing an integral wireless power module according to an embodiment of the present disclosure.

FIG. 4 is an exploded perspective view showing an integral wireless power module 10 according to an embodiment of the present disclosure.

Referring to FIG. 4, a coil layer and a conductive layer, which are included in the wireless power module 10, may be provided in the integral shape. As an example, in the integral wireless power module 10, a PCB-based coil board 11_1 and a coil 12 may be included in the coil layer, the coil 12 may be formed on the coil board 11_1, a wiring board 21 may be formed on the coil 12, and the conductive layer may be formed on the wiring board 21. Accordingly, the coil layer and the conductive layer may be integrally stacked. In this case, the coil board 11_1 and the wiring board 21 may be the PCB, FPCB, FR-3, or FR-4.

FIGS. 5A to 5D are graphs showing noise waveforms of the wireless power signal for each filter.

Figure 5A:
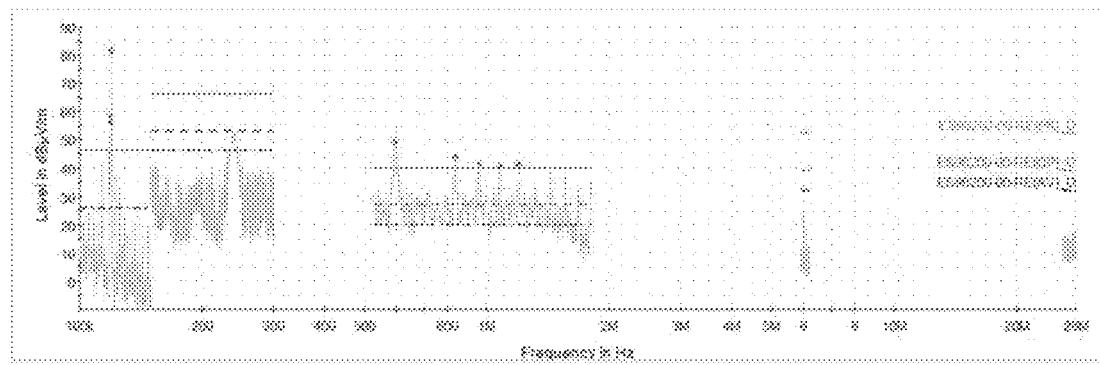
FIGS. 5A to 5D are graphs showing noise waveforms of a wireless power signal for each filter.
Figure 5B:
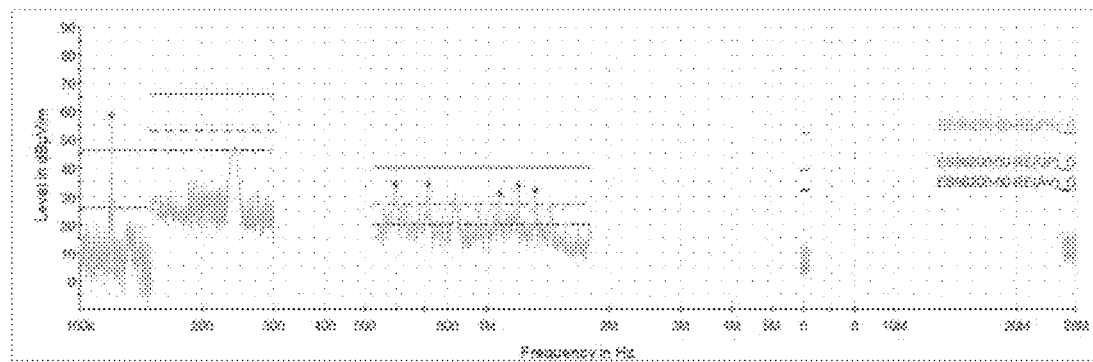
Figure 5C:
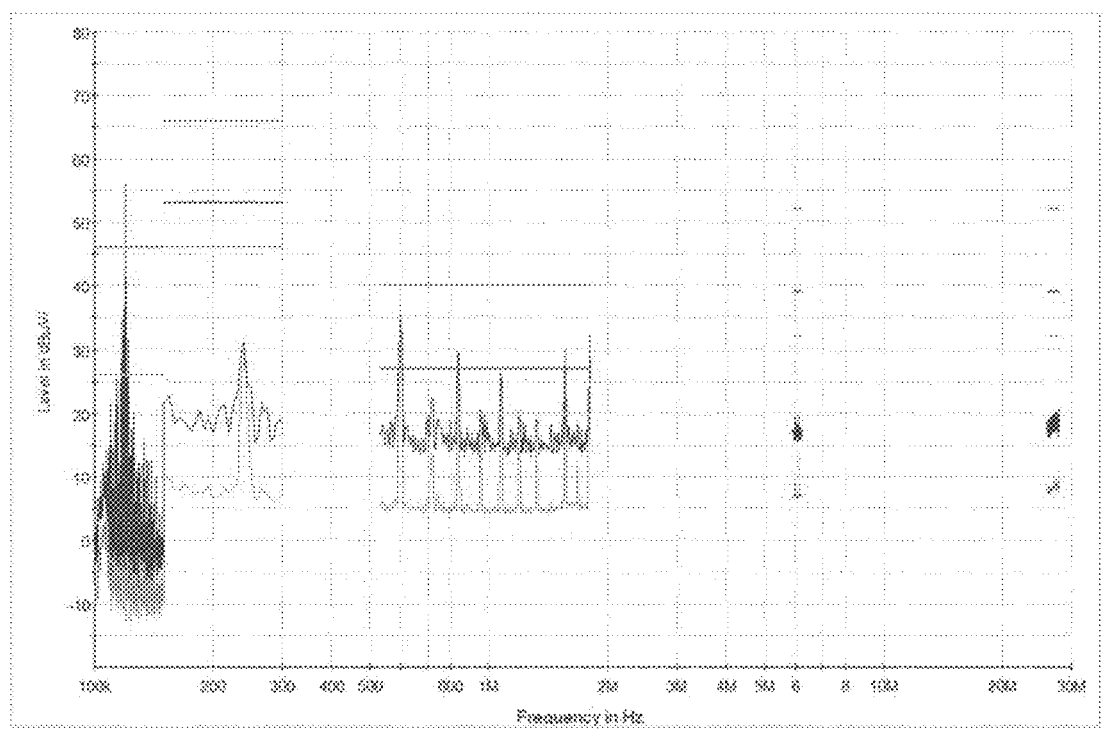
Figure 5D:
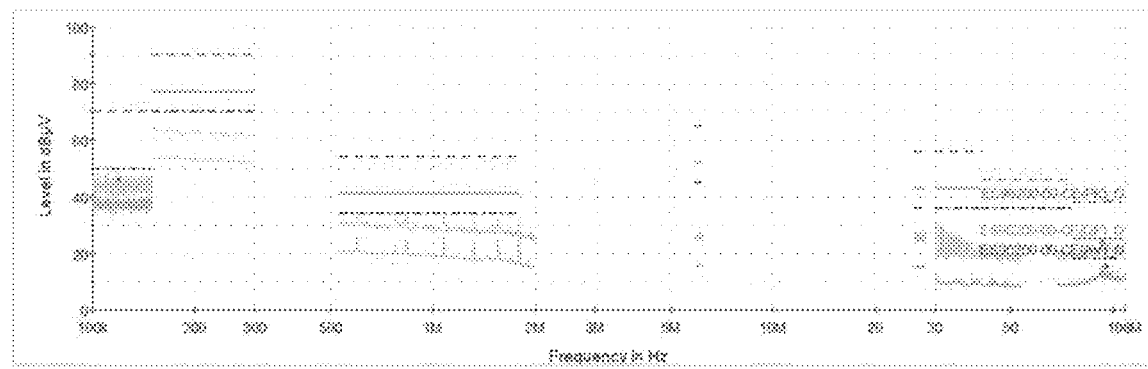

In detail, FIG. 5A shows the noise waveform when the filter is not provided, FIGS. 5B and 5C show the noise waveform of the filter that is not perpendicular or similarly perpendicular to the curved area of the coil 12, and FIG. 5D shows the noise waveform with respect to the wireless power module 10 according to an embodiment of the present disclosure.

Referring to FIG. 5A, when the filter is not applied, the noise is not blocked in all bands below about 2 MHz based on a reference line (red line).

Referring to FIGS. 5B and 5C, the noise is not blocked in some bands in the case of conventional filters.

Referring to FIG. 5D, since the conductive layer that is perpendicular or similarly perpendicular to the curved area of the coil 12 is applied to the wireless power module 10 according to the embodiment of the present disclosure, the noise may be effectively blocked in all bands.

A ferrite wall structure may be applied to the wireless power modules 10 according to the various embodiments of the present disclosure to reduce the noise generated between the coils during the wireless power transmission and reception with high power.

Figure 6:
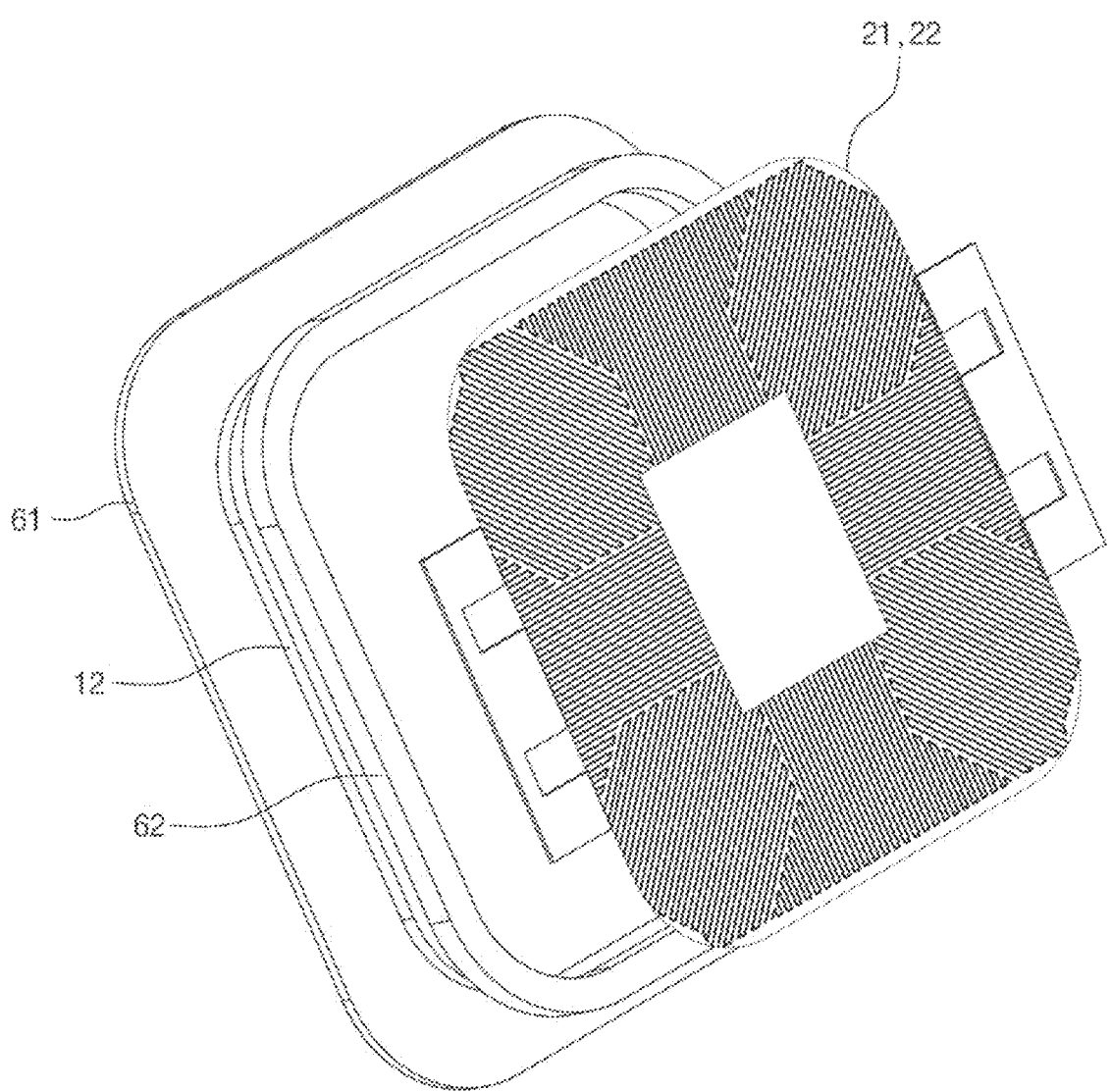
FIG. 6 is a perspective view showing a wireless power module to which a ferrite wall structure is applied according to an embodiment of the present disclosure.
Figure 7A:
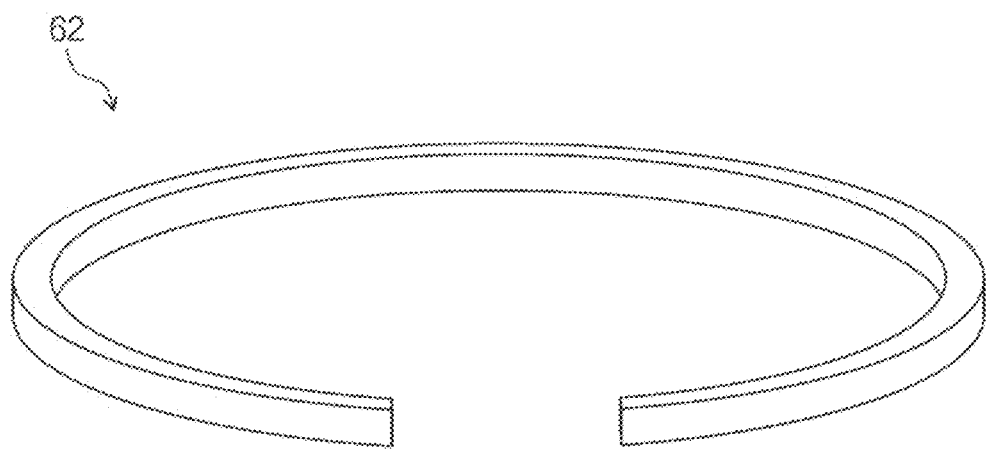
FIGS. 7A to 7C are perspective views showing ferrite walls according to embodiments of the present disclosure.
Figure 7B:
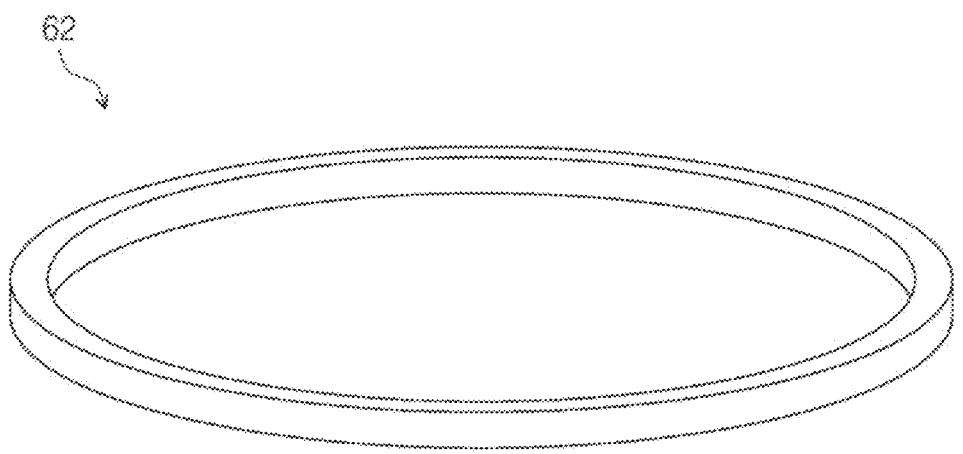
Figure 7C:
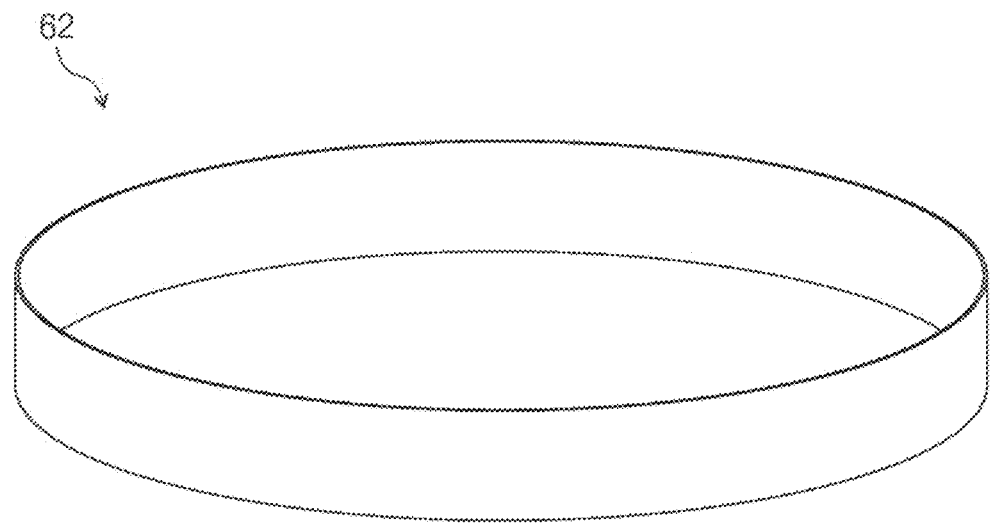

FIG. 6 is a perspective view showing the wireless power module to which the ferrite wall structure is applied according to an embodiment of the present disclosure. FIGS. 7A to 7C are perspective views showing ferrite walls according to embodiments of the present disclosure.

Referring to FIG. 6, the wireless power module 10 to which the ferrite wall structure according to the embodiment of the present disclosure is applied may include a ferrite plate 61, a coil 12, a ferrite wall 62, and a conductive layer 21 and 22.

The ferrite plate 61 and the ferrite wall 62 may be formed of a ferrite material. The ferrite plate 61 may correspond to the ferrite 11 described with reference to FIG. 1.

The coil 12 and the ferrite wall 62 may be disposed on the ferrite plate 61. The coil 12 may be wound on the ferrite plate 61. The ferrite wall 62 may have a shape surrounding the coil 12 when viewed in a plane. That is, the ferrite wall 62 may be disposed between the ferrite plate 61 and the coil 12 when viewed in a plane. The conductive layer 21 and 22 may be disposed on the coil 12.

Referring to FIGS. 7A to 7C, the ferrite wall 62 may have a variety of shapes to shield the noise. As an example, the ferrite wall 62 may have a shape corresponding to that of the coil layer while surrounding the coil 12 as shown in FIGS. 7A and 7B. In this case, a portion of the ferrite wall 62 may be opened such that two terminals of the coil 12 may pass as shown in FIG. 7B. The ferrite wall 62 may be provided in plural, and the ferrite walls 62 may be stacked in a thickness direction of the coil 12.

As an example, the ferrite wall 62 may be provided in the form of a ferrite sheet with a predetermined height and width as shown in FIG. 7C. In this case, the predetermined height and width may have values sufficient to surround the coil 12. When the ferrite wall 62 has the form of the ferrite sheet, an insertion hole may be formed through one side of the ferrite wall 62 to allow the two terminals of the coil 12 to pass through the insertion hole.

Figure 8A:
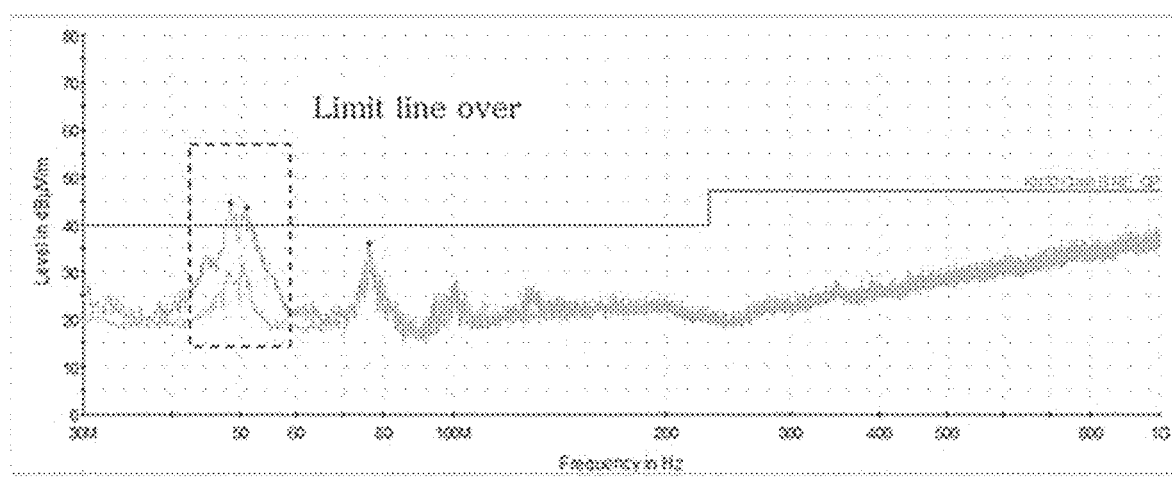
FIGS. 8A and 8B are graphs showing noise waveforms according to whether or not a ferrite wall structure is applied.
Figure 8B:
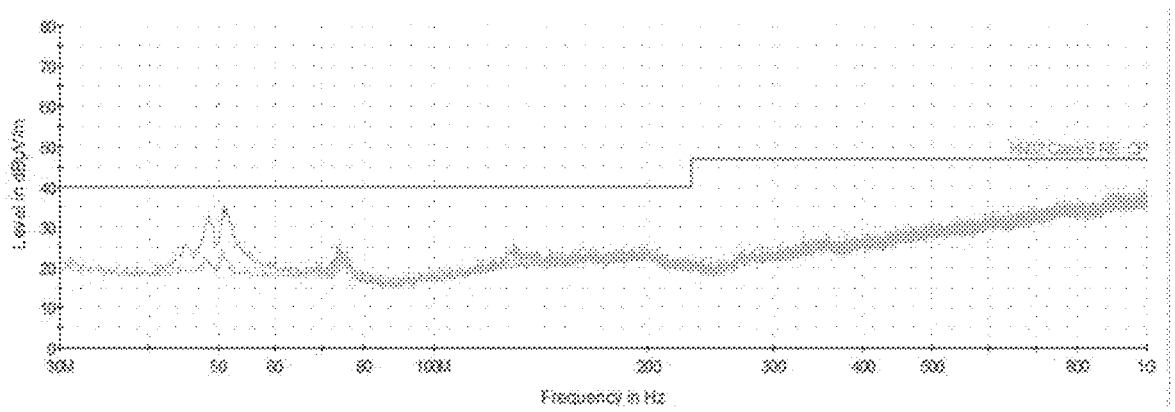

FIGS. 8A and 8B are graphs showing noise waveforms according to whether or not the ferrite wall structure is applied.

Referring to FIGS. 8A and 8B, the noise is generated at a specific band in the wireless power module 10 to which the filter is not applied. However, in the case of the wireless power module 10 to which the ferrite wall structure is applied, the noise generated at a frequency band of FIG. 8A may be effectively blocked.

The wireless power modules 10 according to the various embodiments of the present disclosure may further include a near field communication (NFC) line.

Figure 9A:
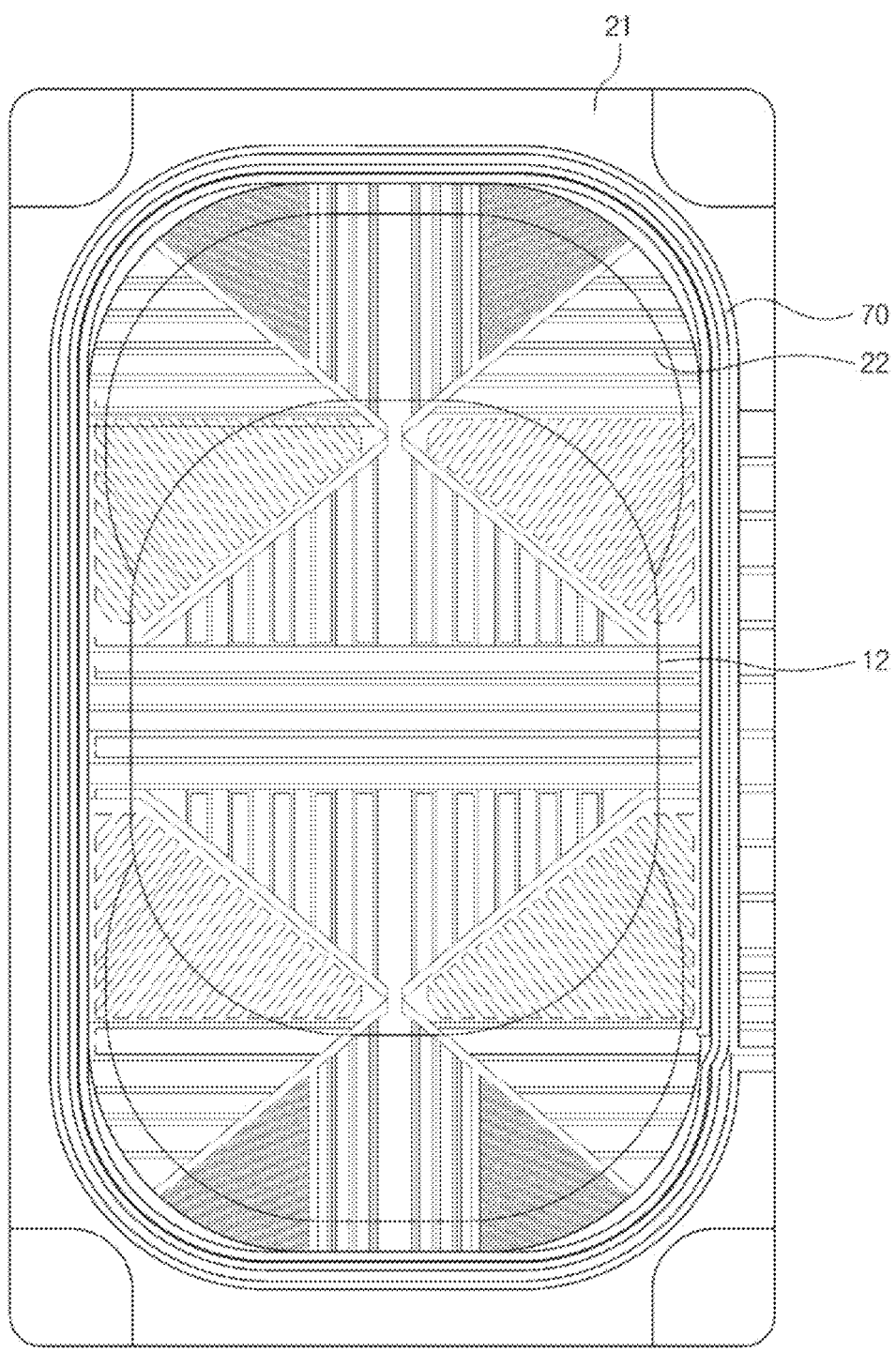
FIGS. 9A and 9B are plan views showing wireless power modules including an NFC line according to embodiments of the present disclosure.
Figure 9B:
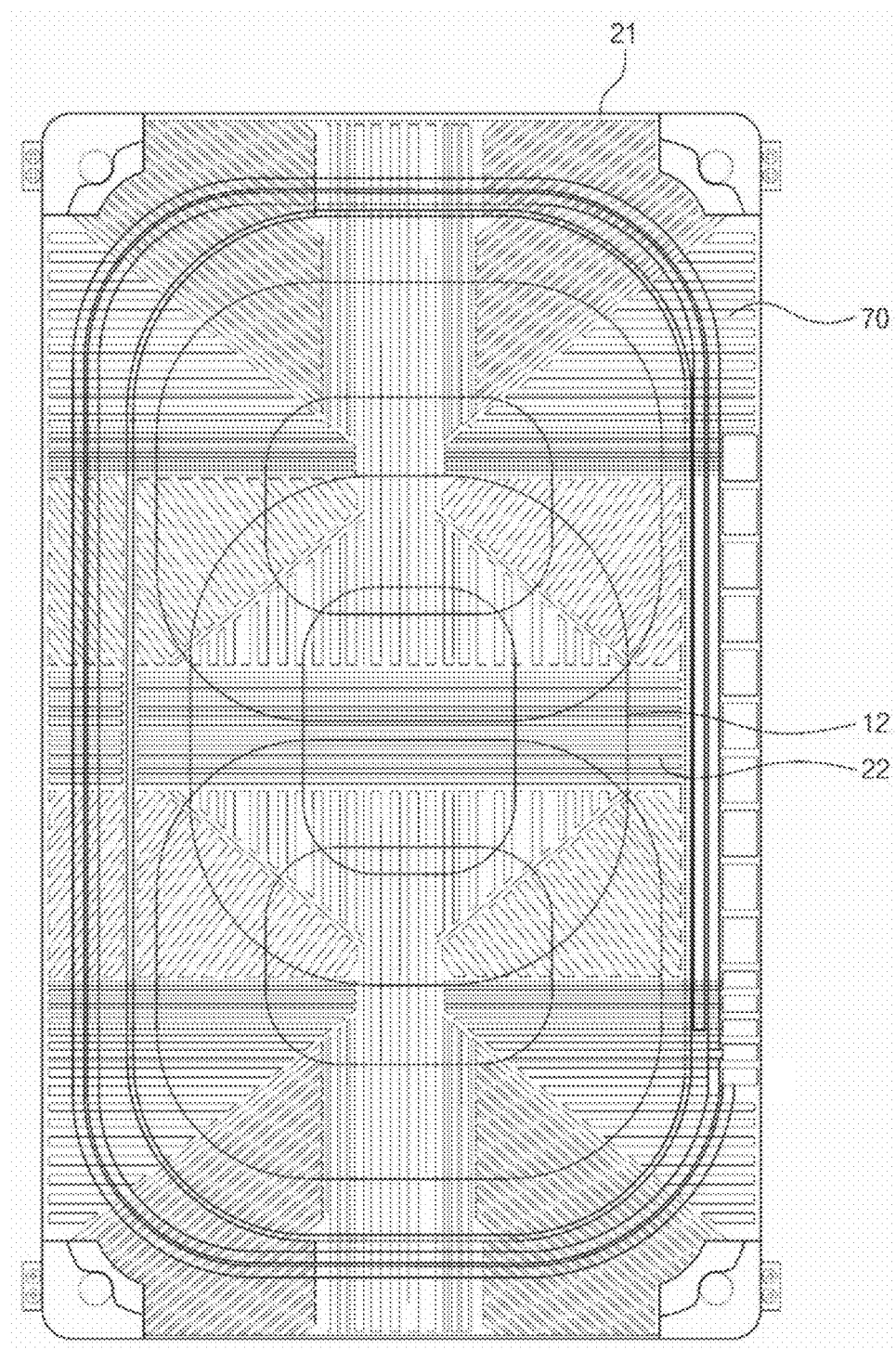

FIGS. 9A and 9B are plan views showing wireless power modules including the NFC line according to embodiments of the present disclosure.

Referring to FIGS. 9A and 9B, the wireless power module 10 may further include the NFC line 70 disposed on the substrate. The NFC line 70 may be disposed on a wiring board 21 together with a conductive line 22, and one end of the NFC line 70 may be connected to an input/output terminal. The NFC line 70 may have a variety of shapes.

As an example, the NFC line 70 may be wound to have a plurality of loop shapes as shown in FIG. 9A. In addition, the NFC line 70 may be disposed to overlap the conductive line 22 in some areas, and the conductive line 22 may be disposed at an upper end position in the overlapping area.

As an example, the NFC line 70 may be formed to have substantially the same pattern as that of the conductive line 22 according to the various embodiments of the present disclosure as shown in FIG. 9B. For example, the NFC line 70 may include an outer loop line, a base branch line branched from the outer loop line, and a first branch line and a second branch line, which are respectively branched from the outer loop line and the base branch line.

The other end of the first branch line and the other end of the second branch line may be short circuited as the conductive line 22, and the first branch line and the second branch line may be alternately arranged with each other.

In addition, the NFC line 70 may be disposed to partially overlap the conductive line 22, and the conductive line 22 may be disposed at an upper end position in the overlapping area.

Electronic Device

Figure 10:
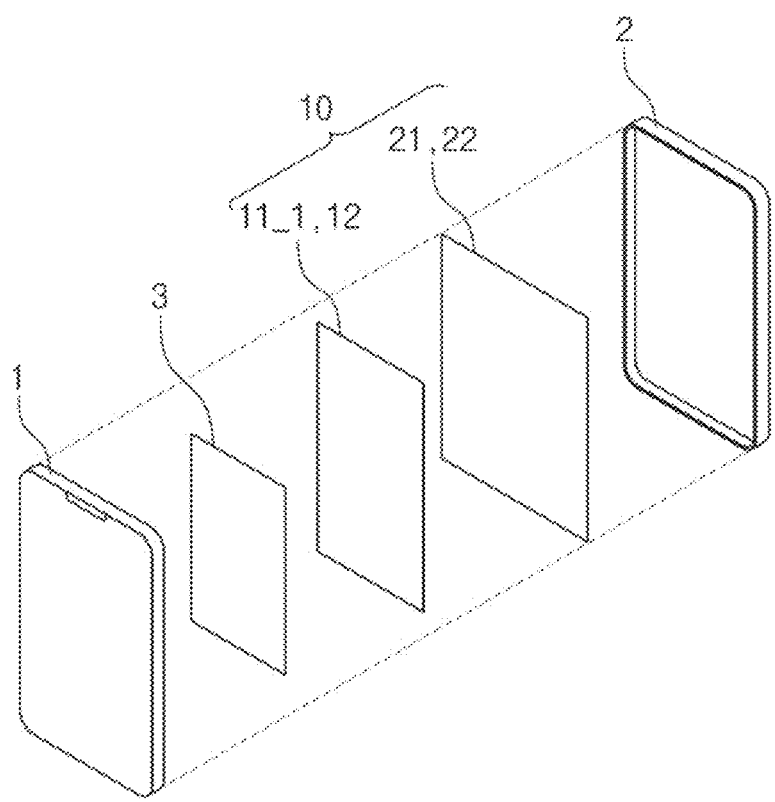
FIG. 10 is a perspective view showing an electronic device including a wireless power module according to an embodiment of the present disclosure.

FIG. 10 is a perspective view showing an electronic device including a wireless power module according to an embodiment of the present disclosure.

Referring to FIG. 10, the electronic device may include a body 1, the wireless power module 10, and a cover 2. The electronic device may be, for example, a mobile terminal.

The wireless power module 10 may include the wireless power modules 10 according to the various embodiments of the present disclosure.

The wireless power module 10 may be disposed between the body 1 and the cover z, and coil layers 11_1 and 12 included in the wireless power module 10 may be electrically connected to the body 1 and may provide the wireless power to a wireless power receiver coupled to the wireless power module 10. In this case, a conductive layer 21 and 22 included in the wireless power module 10 may block the noise of the wireless power signal.

In addition, a shielding sheet 3 may be disposed between the coil layers 11_1 and 12 and the body 1 as needed.

It is obvious that examples of the proposed scheme described above may also be regarded as a kind of proposed schemes as they may be included as one of the implementation methods of the present disclosure. In addition, the proposed schemes may be implemented independently, but may be implemented in a combination (or merge) of some proposed schemes.

Although the embodiments of the present disclosure have been described with reference to the accompanying drawings, the present disclosure should not be limited to the above-illustrated embodiments, and various kinds of modifications and variations may be added to the embodiments within the same or equal scope of the present disclosure by one skilled in the art. However, even if the working effect of the invention is not disclosed in the specification, the effect still can be considered in assessing inventiveness if the effect can be inferred from the descriptions in the specification.

What is claimed is:

1. A wireless power module comprising:
   a coil layer comprising a coil comprising a curved area;
   a wiring board disposed on the coil layer; and
   a plurality of conductive lines disposed on the wiring board,
   wherein at least a portion of the conductive lines crosses the curved area within a predetermined angle range when viewed in a plane, and the conductive lines comprise, an outer loop line disposed on the wiring board, and a plurality of branch lines included in the outer loop line, the branch lines branched into at least four axial directions crossing each other and comprising a first branch line and second branch line, and a position at which one end of the first branch line being short-circuited being different from a position at which one end of the second branch line is short-circuited.

2. The wireless power module of claim 1, wherein the predetermined angle range comprises about 90 degrees.

3. The wireless power module of claim 2, wherein the predetermined angle range comprises a maximum value obtained by adding a predetermined value to the angle of about 90 degrees and a minimum value obtained by subtracting the predetermined value from the angle of about 90 degrees.

4. The wireless power module of claim 3, wherein the predetermined value is about 5 degrees.

5. The wireless power module of claim 1, wherein the conductive lines further comprise:

an inner loop line disposed on the wiring board and spaced apart from the outer loop line;

the first branch line comprises one end connected to the outer loop line and the other end short circuited; and the second branch line comprises one end connected to the inner loop line and the other end short circuited.

6. The wireless power module of claim 5, wherein the first branch line and the second branch line cross the curved area within the predetermined angle range when viewed in the plane.

7. The wireless power module of claim 5, wherein the first branch line and the second branch line are alternately branched respectively from the outer loop line and the inner loop line.

8. The wireless power module of claim 1, wherein the conductive lines further comprise:

a base branch line branched from the outer loop line toward inside the wiring board;

the first branch line comprises one end connected to the outer loop line and the other end short circuited; and the second branch line comprises one end connected to the base branch line and the other end short circuited, the first branch line and the second branch line crossing the curved area within the predetermined angle range when viewed in the plane.

9. The wireless power module of claim 1, wherein the conductive lines further comprise:

an inner loop line disposed on the wiring board and spaced apart from the outer loop line; and a connection line branched from the outer loop line toward inside the wiring board and protruded from the inner loop line by a predetermined length, the connection line connecting the outer loop line to the inner loop line.

10. The wireless power module of claim 9, wherein the first branch line comprises one end connected to the outer loop line and the other end short circuited, the second branch line comprises one end connected to the inner loop line and the other end short circuited, and the first branch line and the second branch line cross the curved area within the predetermined angle range when viewed in the plane.

11. The wireless power module of claim 1, wherein the conductive lines further comprise:

a plurality of inner base annular lines disposed on the wiring board and spaced apart from the outer loop line;

a connection line branched from the outer loop line toward inside the wiring board and protruded from the inner base annular lines by a predetermined length; and a base branch line branched from the outer loop line and passing through between the inner base annular lines, the connection line connecting the outer loop line to the inner base annular lines.

12. The wireless power module of claim 11, wherein one end of the first branch line is connected to the outer loop line and the other end of the first branch line is short circuited, one end of the second branch line is connected to one of the inner base annular lines, and the other end of the second branch line is short circuited, and the first branch line and the second branch line cross the curved area within the predetermined angle range when viewed in the plane.

13. An electronic device comprising:

a body;

a cover disposed to correspond to the body; and a wireless power module disposed between the body and the cover, the wireless power module comprising:

a coil layer comprising a coil electrically connected to the body and comprising a curved area, a wiring board disposed on the coil layer, and a plurality of conductive lines disposed on the wiring board, at least a portion of the conductive lines crossing the curved area within a predetermined angle range when viewed in a plane, the conductive lines comprising, an outer loop line disposed on the wiring board, and a plurality of branch lines included in the outer loop line, the branch lines branched into at least four axial directions crossing each other and comprising a first branch line and second branch line, and a position at which one end of the first branch line being short-circuited being different from a position at which one end of the second branch line is short-circuited.

* * * * *